United States Patent
Wang et al.

(10) Patent No.: US 11,429,303 B2
(45) Date of Patent: Aug. 30, 2022

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Xingshan Wang, Shanghai (CN); Ao Sun, Shanghai (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 17/244,925

(22) Filed: Apr. 29, 2021

(65) Prior Publication Data

US 2022/0244878 A1    Aug. 4, 2022

(30) Foreign Application Priority Data

Jan. 29, 2021  (CN) ......................... 202110124013.X (51) Int. Cl.
  *G06F 3/06*  (2006.01)
(52) U.S. Cl.
  CPC .......... *G06F 3/0647* (2013.01); *G06F 3/0604* (2013.01); *G06F 3/067* (2013.01); *G06F 3/0619* (2013.01); *G06F 3/0659* (2013.01); *G06F 3/0683* (2013.01)

(58) Field of Classification Search
  CPC .... G06F 3/067; G06F 16/182; G06F 16/1827; G06F 3/06; G06F 3/0605; G06F 3/061; G06F 3/0649; G06F 3/0685; G06F 11/1076; G06F 3/0622; G06F 3/0653
  See application file for complete search history.

(56) References Cited

U.S. PATENT DOCUMENTS

2020/0012442 A1* 1/2020 Yang ..................... H04L 29/08
2020/0125286 A1* 4/2020 Wang .................. G06F 11/1076

\* cited by examiner

*Primary Examiner* — Yong J Choe
(74) *Attorney, Agent, or Firm* — Amin, Turocy & Watson, LLP (57) ABSTRACT

A storage system is managed. For example, in response to a request at a first storage node for data related to a second storage node, it is determined whether the first storage node and the second storage node belong to the same storage node group having an interconnection structure. If it is determined that the first storage node and the second storage node belong to different storage node groups, data is transmitted between the first storage node and the second storage node based on a mapping between storage nodes in a first storage node group with the first storage node and storage nodes in a second storage node group with the second storage node. Thus, data transmission can be performed between different storage node groups through a mapping relationship.

20 Claims, 6 Drawing Sheets

METHOD, DEVICE, AND COMPUTER PROGRAM PRODUCT FOR MANAGING STORAGE SYSTEM

RELATED APPLICATION

The present application claims the benefit of priority to Chinese Patent Application No. 202110124013.X, filed on Jan. 29, 2021, which application is hereby incorporated into the present application by reference herein in its entirety.

TECHNICAL FIELD

Embodiments of the present disclosure generally relate to the field of data storage, and in particular, to a method, a device, and a computer program product for managing a backup storage system.

BACKGROUND

With the development and progress of data storage technology, distributed storage technology is increasingly used in large-scale storage systems. In a distributed storage system, data needs to be transmitted between different storage nodes. As distributed storage systems become larger and larger, the number of storage nodes in the distributed storage systems gradually increases, and the amount of stored data also gradually increases. How to transmit data between various nodes of the storage systems more effectively is a problem worthy of attention.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

Embodiments of the present disclosure provide a method, a device, and a computer program product for managing a storage system.

In a first aspect of the present disclosure, a method for managing a storage system is provided. The method includes: determining, in response to a request at a first storage node for data related to a second storage node, whether the first storage node and the second storage node belong to the same storage node group in the storage system, storage nodes in the same storage node group having an interconnection structure; and if it is determined that the first storage node and the second storage node belong to different storage node groups, transmitting data between the first storage node and the second storage node based on mapping between storage nodes in a first storage node group and storage nodes in a second storage node group, the first storage node group including the first storage node and the second storage node group including the second storage node.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions. The actions include: determining, in response to a request at a first storage node for data related to a second storage node, whether the first storage node and the second storage node belong to the same storage node group in the storage system, storage nodes in the same storage node group having an interconnection structure; and if it is determined that the first storage node and the second storage node belong to different storage node groups, transmitting data between the first storage node and the second storage node based on mapping between storage nodes in a first storage node group and storage nodes in a second storage node group, the first storage node group including the first storage node and the second storage node group including the second storage node.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

The Summary of the Invention section is provided to introduce the selection of concepts in a simplified form, which will be further described in the Detailed Description below. The Summary of the Invention section is neither intended to identify key features or essential features of the present disclosure, nor intended to limit the scope of the present disclosure.

BRIEF DESCRIPTION OF THE DRAWINGS

The above and other objects, features, and advantages of the present disclosure will become more apparent by describing the example embodiments of the present disclosure in more detail in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

Example embodiments of the present disclosure will be described in more detail below with reference to the accompanying drawings. Although the example embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" means "at least one further embodiment." The terms "first," "second," and the like may refer to different or identical objects. Other explicit and implicit definitions may also be included below.

Figure 1:
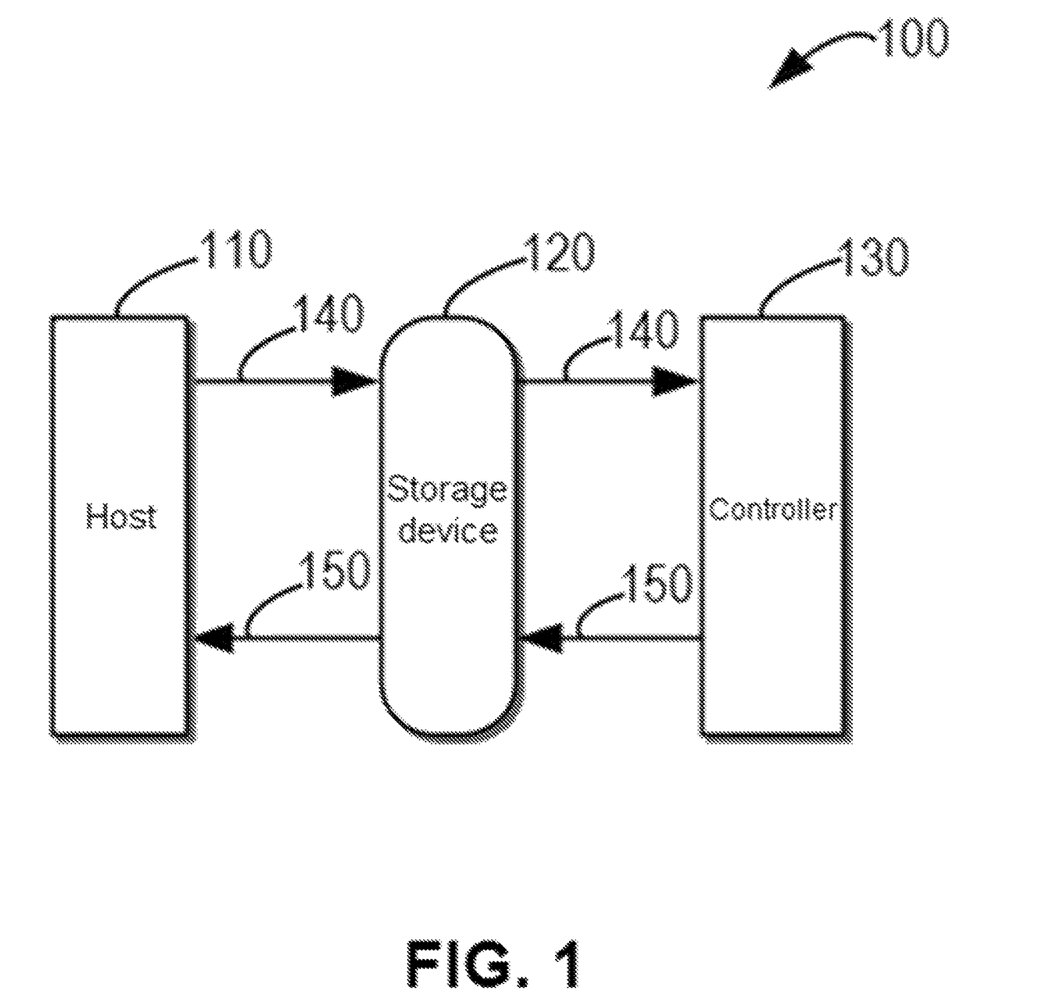
FIG. 1 shows a block diagram of an example storage system in which an embodiment of the present disclosure can be implemented.

FIG. 1 shows a schematic diagram of storage system 100 in which an embodiment of the present disclosure may be implemented. Storage system 100 includes host 110, storage device 120, and controller 130. It should be understood that although storage device 120 is shown as a whole in FIG. 1, storage system 100 has distributed storage device 120 that includes a plurality of storage nodes to provide storage capabilities. Storage device 120 may utilize multiple storage technologies to provide data storage capabilities. In some embodiments, example storage forms of storage device 120 may include, but are not limited to, a digital versatile disk (DVD), a blue-ray disc (BD), a compact disk (CD), a floppy disk, a hard disk device, a tape drive, an optical drive, a hard disk device drive (HDD), a solid storage device (SSD), a redundant array of independent disks (RAID), or other hard disk devices.

Host 110 of storage system 100 sends request 140 to storage device 120, and storage device 120 sends the received request 140 to controller 130. Controller 130 executes a command on storage device 120 according to request 140 and sends an obtained processing result as response 150 back to host 110 via storage device 120. In some embodiments, request 140 and response 150 may be in the form of a queue. Request 140 may be a request for writing data to storage device 120 or a request for reading data from storage device 120.

Controller 130 executes a command on storage device 120 according to request 140 to write or read data to or from storage device 120. In storage device 120 with a plurality of storage nodes, data writing and data reading processes involve data writing and data reading processes for the plurality of storage nodes. The form of queues may be used to write data to and read data from the plurality of storage nodes.

In the conventional solution, since the storage device includes a plurality of storage nodes, when performing data transmission operations on the storage device, data transmission between the plurality of storage nodes is required. In particular, for a scenario where the number of storage nodes in the storage device is large and a large amount of data operations are required, the number of data streams in the storage device is particularly large. In this case, data transmission will take longer, which will affect the performance of the storage system.

Figure 2:
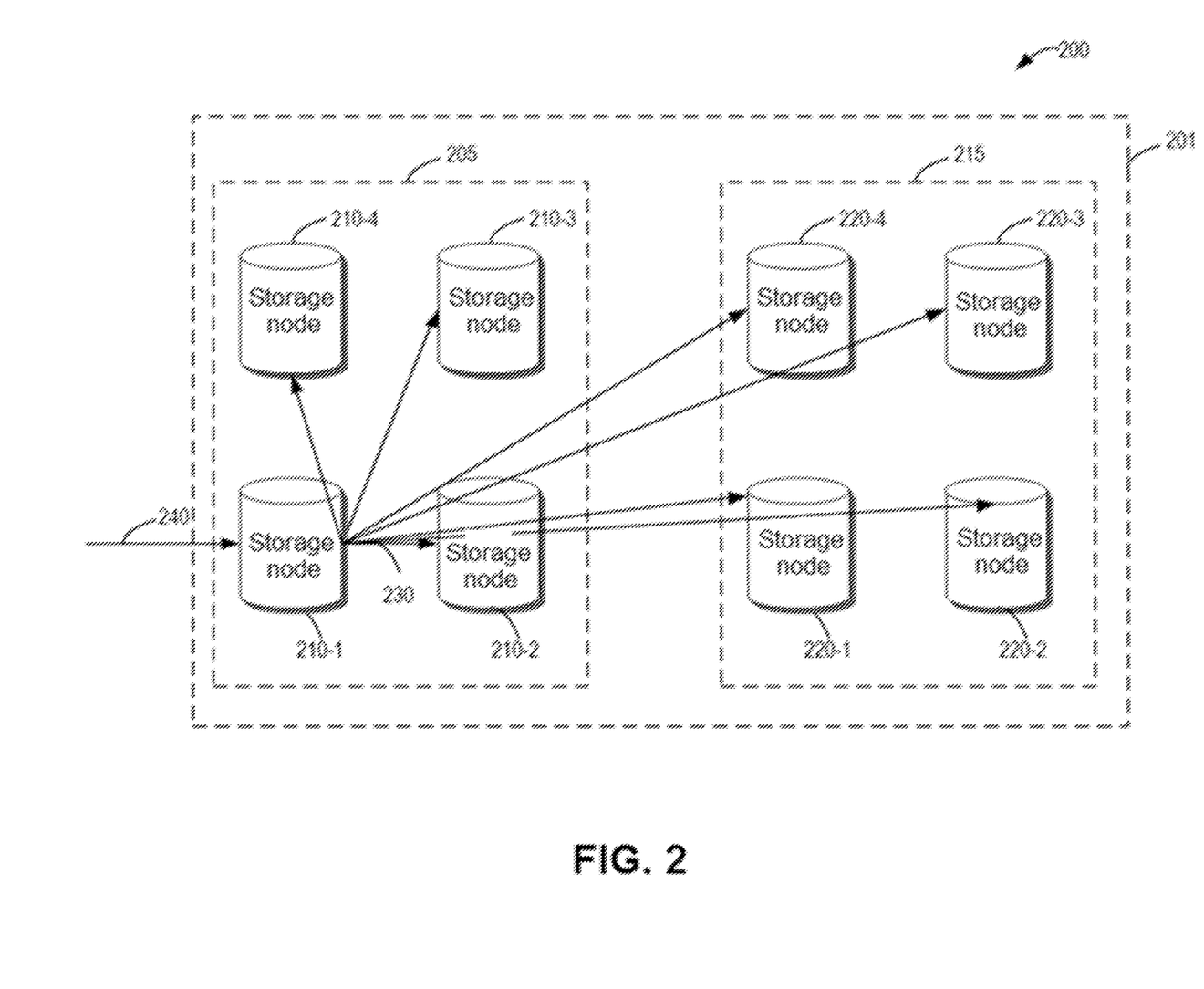
FIG. 2 shows a schematic diagram of a conventional solution for transmitting data between storage nodes of a storage system.

FIG. 2 shows a schematic diagram of conventional solution 200 for transmitting data between storage nodes of a storage system. As shown in FIG. 2, storage system 201 includes first rack 205 and second rack 215. First rack 205 includes storage nodes 210-1, 210-2, 210-3, and 210-4 (collectively or individually referred to as "storage node 210"). Second rack 215 includes storage nodes 220-1, 220-2, 220-3, and 220-4 (collectively or individually referred to as "storage node 220").

In the conventional solution, when storage node 210-1 in first rack 205 receives access request 240, storage node 210-1 will perform data transmission with storage nodes 210-2, 210-3, 210-4, 220-1, 220-2, 220-3, and 220-4. Each storage node may include a plurality of storage units. Data access request 240 will be transmitted to each storage unit in each storage node. Although only 2 racks are shown in FIG. 2 and only 4 storage nodes are included in each rack, this is only schematic. For storage system 201 which includes R racks, each rack including N storage nodes and each storage node including n storage units, when T data requests need to be processed, storage system 201 has data stream pairs (or queue pairs) with the number of $(R \times N+1) \times n \times (T+1)$. It should be understood that R, N, n, and T may be any natural numbers.

In actual use, in the conventional solution, as the number of racks and the number of storage nodes in each rack increase, the number of data streams in storage system 201 increases rapidly. For storage system 201 with a plurality of racks and a plurality of storage nodes, the number of data streams is likely to exceed the maximum bearing capacity of storage system 201 due to the limitation of the use capacity of hardware. The following Table 1 shows the number of queue pairs of several different storage systems in the conventional solution.

TABLE 1

| Example of number of queue pairs in conventional solution | | | | |
|---|---|---|---|---|
| R | N | N | T | Number of queue pairs |
| 1 | 16 | 24 | 7 | 2856 |
| 7 | 16 | 24 | 7 | 18984 |
| 16 | 16 | 24 | 7 | 43176 |

As can be seen from Table 1, when storage system 201 has 16 racks and each rack includes 16 storage nodes, the number of queue pairs reaches 43176. However, the maximum number of queue pairs supported by some hardware devices commonly used at present cannot reach this number. In fact, when the number of queue pairs exceeds 10000, the performance of the hardware devices commonly used at present will be reduced significantly. That is, even if storage system 201 only includes 7 racks, it will still be limited by the capabilities of the hardware devices. Therefore, the conventional solution cannot support storage system 201 with a plurality of storage nodes using a plurality of racks.

On the other hand, with the rapid increase of data streams, storage system 201 needs to allocate more memory space and central processing unit (CPU) resources for processing these large amounts of data streams. As a memory and a CPU are heavily occupied, the performance of storage system 201 is reduced. In addition, since data may be transmitted between different storage nodes in different racks, an interconnection structure needs to be established between the storage nodes. When the number of storage nodes of storage system 201 increases, more time is needed to configure the interconnection structure between the storage nodes of storage system 201. The recovery time when storage system 201 restarts will be prolonged.

The embodiments of the present disclosure provide a solution for managing a storage system to solve one or more of the above problems and other potential problems. In this solution, when a first storage node sends a request for data to a second storage node, it is determined whether the first storage node and the second storage node belong to the same storage node group. If it is determined that the first storage node belongs to a first storage node group and the second storage node belongs to a second storage node group different from the first storage node group, data is transmitted between the first storage node and the second storage node based on mapping between storage nodes in the first storage node group and storage nodes in the second storage node group, instead of being transmitted through an interconnection structure between the first storage node and the second storage node.

In this way, the total number of data streams (or queue pairs) in the storage system can be greatly reduced. In this way, the space occupation of a memory of the storage system can be reduced. In this way, the performance of the storage system can be improved, and data can be transmitted and processed more effectively. In addition, in this way, the startup time of the storage system can be shortened.

Figure 3:
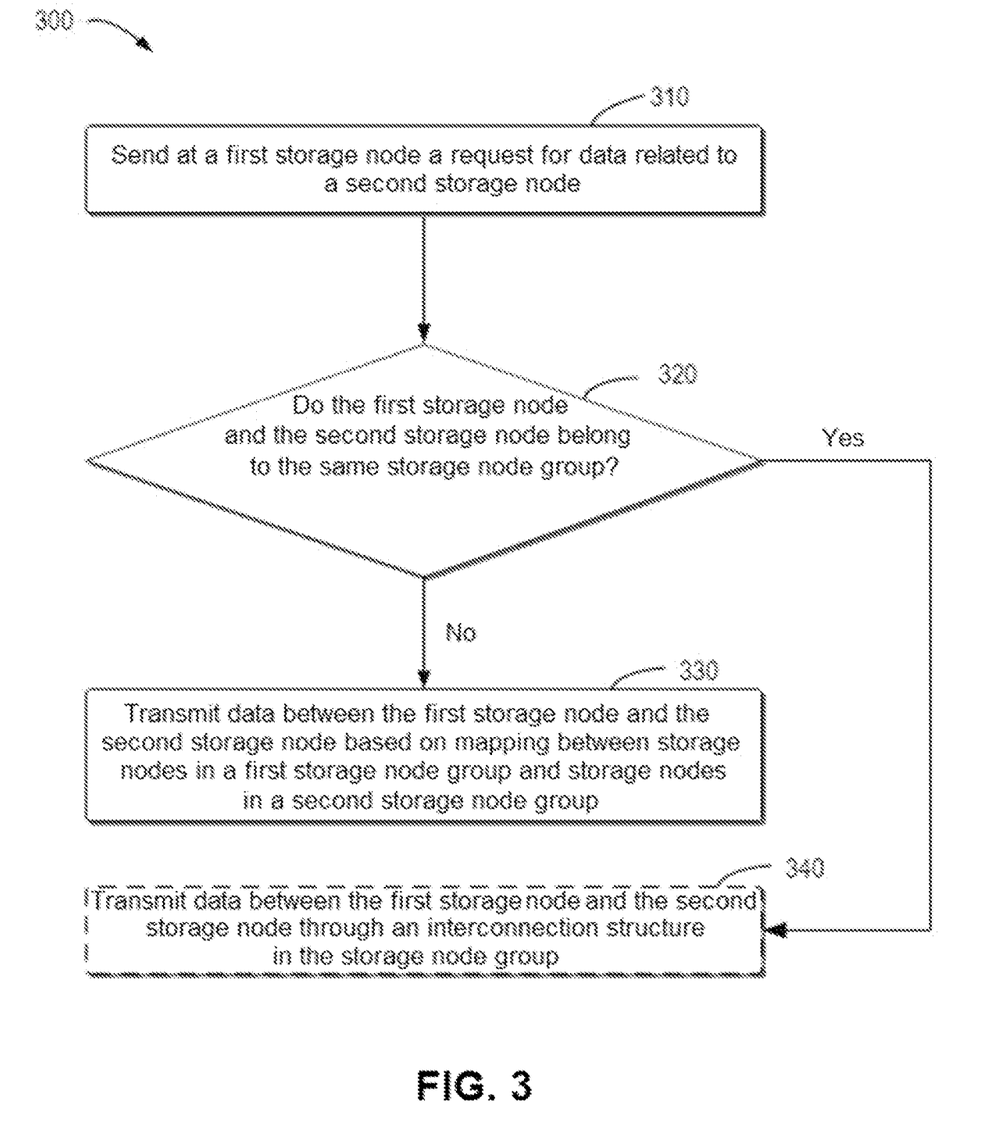
FIG. 3 shows a flow chart of an example method for transmitting data in a storage system according to some embodiments of the present disclosure.

The embodiments of the present disclosure will be described in detail below with reference to the accompanying drawings. FIG. 3 shows a flow chart of example method 300 for transmitting data in storage system 100 according to some embodiments of the present disclosure. Method 300 may be, for example, executed by storage system 100 as shown in FIG. 1. It should be understood that method 300 may further include an additional action that is not shown and/or may omit an action that is shown. The scope of the present disclosure is not limited in this regard. Method 300 is described in detail below with reference to FIG. 1.

As shown in FIG. 3, at 310, a request for data is sent at a first storage node to a second storage node. For example, the request for data may be a write request for writing data or a read request for reading data.

At 320, it is determined whether the first storage node and the second storage node belong to the same storage node group in storage system 100. There is an interconnection structure between various storage nodes in the same storage node group. In some embodiments, storage nodes in the same storage node group are located in the same fault tolerance domain. For example, storage system 100 may include a plurality of racks, and each rack may include a plurality of storage nodes. The plurality of storage nodes on the same rack may belong to the same storage node group and belong to the same fault tolerance domain.

If it is determined at 320 that the first storage node belongs to the first storage node group and the second storage node belongs to the second storage node group different from the first storage node group, method 300 proceeds to 330. At 330, data is transmitted between the first storage node and the second storage node based on mapping between storage nodes in the first storage node group and storage nodes in the second storage node group.

For example, one-to-one mapping may be established between a plurality of storage nodes in the first storage node group and a plurality of storage nodes in the second storage node group. For example, a remote direct memory access (RDMA) protocol may be used for data transmission between storage nodes with a mapping relationship.

Figure 5:
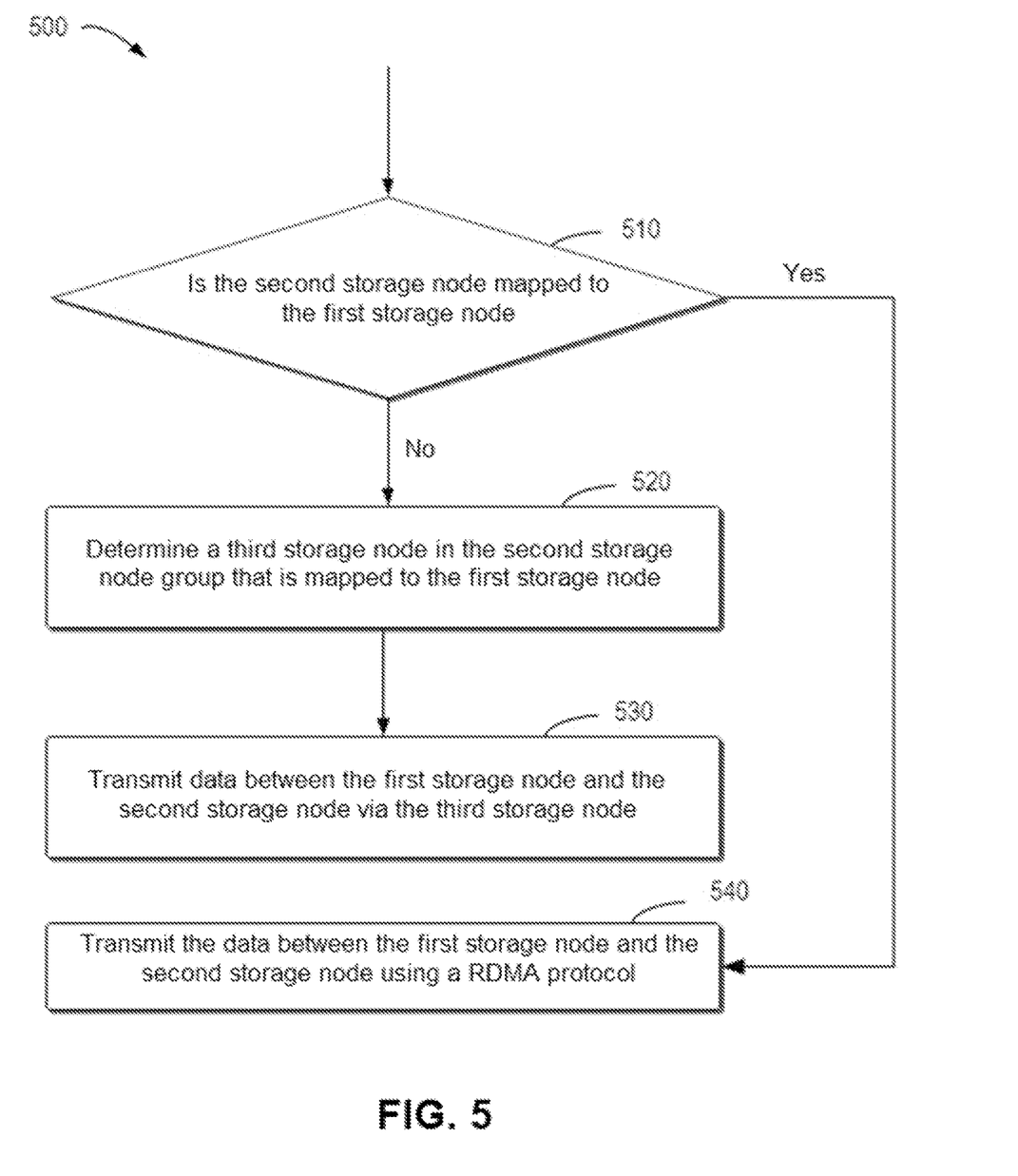
FIG. 5 shows a flow chart of an example method for transmitting data between different storage nodes of a storage system according to some embodiments of the present disclosure.

In some embodiments, method 500 shown in FIG. 5 may be used to transmit data between the first storage node and the second storage node based on the mapping relationship.

The data transmission process will be described in more detail below in conjunction with FIG. 5.

Alternatively or additionally, if it is determined at 320 that the first storage node and the second storage node belong to the same storage node group, method 300 may proceed to 340. At 340, data may be transmitted between the first storage node and the second storage node through an interconnection structure in the storage node group where the first storage node and the second storage node are located.

It can be seen from the above description that the solution for managing a storage system proposed here can be used to avoid the establishment of interconnection structures between various storage nodes in different storage node groups. Through the above solution, data transmission can be performed between storage nodes belonging to different storage node groups through a mapping relationship, without an interconnection relationship therebetween. In this way, the number of data streams in storage system 100 can be greatly reduced, thereby reducing the hardware usage burden of storage system 100. In this way, the performance of the storage system can be improved, and data can be transmitted more effectively.

Figure 4:
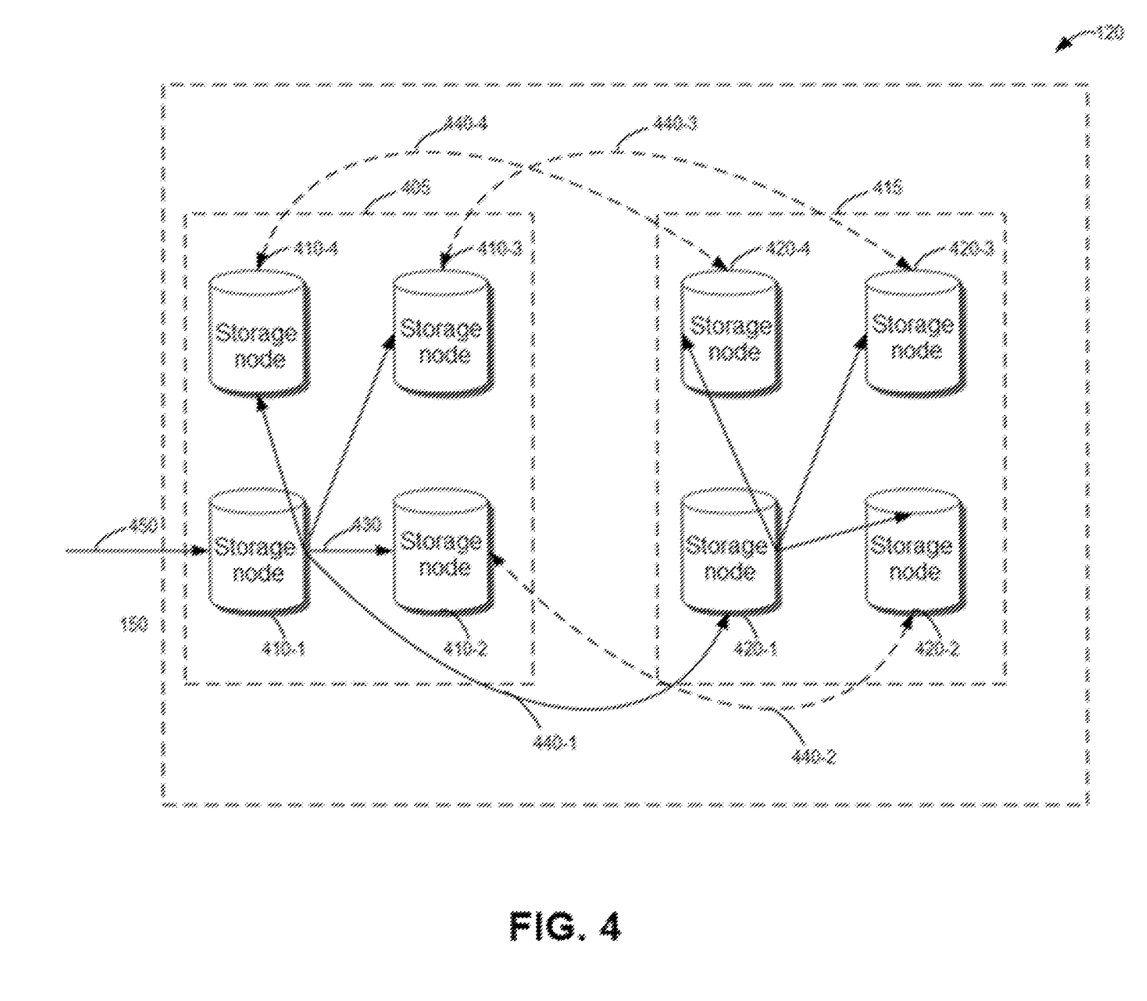
FIG. 4 shows a schematic diagram of transmitting data in a storage system according to some embodiments of the present disclosure.

Example method 300 for transmitting data in storage system 100 according to some embodiments of the present disclosure has been described above with reference to FIG. 3. In some embodiments, method 300 described above may be used to perform data transmission on storage device 120 with reference to FIG. 4. FIG. 4 will be described in more detail below with reference to FIG. 1 and FIG. 3.

As shown in FIG. 4, storage device 120 in storage system 100 may include two storage node groups, that is, first storage node group 405 and second storage node group 415. First storage node group 405 includes storage nodes 410-1, 410-2, 410-3, and 410-4 (collectively or individually referred to as "storage node 410"). Second storage node group 415 includes storage nodes 420-1, 420-2, 420-3, and 420-4 (collectively or individually referred to as "storage node 420").

For example, when storage node 410-1 (also referred to herein as "first storage node") receives data access request 450, the first storage node will send the access request to each storage node in the storage system, that is, storage nodes 410-2, 410-3, 410-4, 420-1, 420-2, 420-3, and 420-4. Interconnection structure 430 inside first storage node group 405 may be used to send access requests to the remaining storage nodes 410 inside first storage node group 405. It should be understood that although interconnection structure 430 between storage nodes 410 is shown as a single arrow in FIG. 4, this is only schematic. This is only to indicate that storage node 410-1 sends data requests to storage nodes 410-2, 410-3, and 410-4 in this example. It should be understood that the interconnection structure between storage nodes 410 is a bidirectional interconnection structure.

In some embodiments, storage system 100 may be a storage system based on a non-volatile memory express (NVMe). The interconnection structure inside the storage node group may use an NVMe over fabrics (NVMe-oF) data transmission protocol for data transmission. The data transmission may be in the form of queue pairs, and the number of data streams may be represented by the number of queue pairs. It should be understood that storage system 100 may also be a storage system based on other standards or protocols, such as a storage system using a transmission control protocol (TCP) or a fiber channel.

For storage node 420 in second storage node group 415, there is no interconnection structure between this storage node and storage node 410-1. Data is transmitted between first storage node 410-1 and storage node 420 based on mapping between storage node 410 in first storage node group 405 and storage node 420 in second storage node group 415.

For example, as shown in FIG. 4, there is a mapping relationship between storage node 410-1 in first storage node group 405 and storage node 420-1 in second storage node group 415. It should be understood that although mapping 410-1 between storage node 410-1 and storage node 420-1 is shown as a single arrow in FIG. 4, this is only schematic. This is only to indicate that storage node 410-1 sends a data request to storage node 420-1 in this example. It should be understood that the mapping between storage node 410-1 and storage node 420-1 may be bidirectional.

Mapping 440-2 between storage node 410-2 and storage node 420-2, mapping 440-3 between storage node 410-3 and storage node 420-3, and mapping 440-4 between storage node 410-4 and storage node 420-4 are also shown in FIG. 4. It should be understood that although the mapping between storage node 410 of first storage node group 405 and storage node 420 of second storage node group 415 in FIG. 4 is shown as one-to-one mapping, this is only schematic. In some other embodiments, other mapping relationships may also be used.

As shown in FIG. 4, a data request may be sent from storage node 410-1 to storage node 420-1 using the RDMA protocol. The data request may be sent to a plurality of other storage nodes 420-2, 420-3, and 420-4 using the interconnection structure in second storage node group 415 via storage node 420-1.

It should be understood that, although only 2 storage node groups are shown in FIG. 4 and each storage node group includes only 4 storage nodes, this is only schematic. Storage system 100 may include any number of storage node groups, and each storage node group may also include any number of storage nodes. For example, for storage system 201 which includes R storage node groups (or racks), each storage node group including N storage nodes and each storage node including n storage units, when T data requests need to be processed, storage system 201 has data streams (or queue pairs) with the number of n×N×(T+1)+n×(T+1)+T×R×2. It should be understood that R, N, n, and T may be any natural numbers, which do not limit the present disclosure in any way. The following Table 2 shows the number of queue pairs in some embodiments of the present application. It should be understood that Table 2 is only schematic, and in some other embodiments, other numbers of storage node groups, storage nodes, storage units, data requests, etc. may be used.

TABLE 2

Example of number of queue pairs

| R | N | n | T | Number of queue pairs |
|---|---|---|---|---|
| 1 | 16 | 24 | 7 | 2856 |
| 7 | 16 | 24 | 7 | 2898 |
| 16 | 16 | 24 | 7 | 2952 |

It can be seen from Table 2 that compared with Table 1 described above, the number of queue pairs is greatly reduced. Therefore, the number of storage nodes in storage system 100 is not limited by the use capacity of hardware devices. Compared with the conventional solution shown in FIG. 2, the method described with reference to FIGS. 3 and 4 can greatly reduce the number of data streams (or queue pairs). In this way, the hardware usage burden of storage system 100 can be reduced.

In addition, since the number of data streams is reduced, less memory space and CPU resources can be occupied. Therefore, more memory space and CPU resources are not occupied, so more memory space and CPU resources can be used to perform other operations of storage system 100. Therefore, the performance of storage system 100 can be improved, and data can be transmitted more effectively.

In addition, since not all the storage nodes inside storage device 120 need to have an interconnection structure with each other, the structure is simpler. Especially when storage system 100 is started or restarted, since the connection structure of storage device 120 is simpler, the startup process of storage system 100 may be accelerated. On the other hand, a mapping relationship between different storage node groups basically does not introduce time delay to the data transmission process of storage system 100, so that the rapid completion of the data transmission process can be well ensured.

Schematic method 300 for transmitting data in storage system 100 has been described above with reference to FIGS. 3 and 4. In some embodiments, method 500 described with reference to the flow chart of FIG. 5 may also be used to transmit data between different storage nodes of storage system 100. Method 500 may be regarded as an example implementation of block 330 in method 300. It should be understood that method 500 may also include additional actions not shown and/or omit actions shown, and the scope of the present disclosure is not limited in this regard. Method 500 is described in detail below with reference to FIGS. 1 and 4.

As shown in FIG. 5, at 510, it may be determined whether the second storage node is mapped to the first storage node. If it is determined at 510 that the second storage node is not mapped to the first storage node, method 500 proceeds to 520. For example, if the first storage node is storage node 410-1 in first storage node group 405 in FIG. 4 and the second storage node is storage node 420-2 in second storage node group 415 in the figure, the second storage node is not mapped to the first storage node.

At 520, a third storage node in the second storage node group that is mapped to the first storage node may be determined. For example, in the example described above, the third storage node is storage node 420-1 in FIG. 4.

At 530, data may be transmitted between the first storage node and the second storage node via the third storage node. For example, data is first transmitted between storage nodes 410-1 and 420-1 using an RDMA protocol via storage node 420-1. After that, data is transmitted between storage nodes 420-1 and 420-2 through an interconnection structure inside second storage node group 415. In this way, there is no need to establish an interconnection structure between storage node 410-1 and storage node 420-2, and data may be transmitted between storage node 410-1 and storage node 420-2 via storage node 420-1.

Alternatively or additionally, in some embodiments, a data request between the first storage node and the second storage node may be a read request to read data. In this case, the RDMA protocol is used to send the read request to the third storage node. The third storage node sends the read request to the second storage node through the interconnection structure. The third storage node receives data that needs to be read from the second storage node through the interconnection structure. The first storage node receives the data from the third storage node.

Alternatively or additionally, in some embodiments, a data request between the first storage node and the second storage node may be a write request to write data. In this case, the RDMA protocol is used to send the write request to the third storage node and send data to be written. The third storage node sends the write request and the data to be written to the second storage node through the interconnection structure. In addition, the third storage node may also send a message that the second storage node has completed data writing to the first storage node through the interconnection structure.

With continued reference to FIG. 5, if it is determined at 510 that the second storage node is mapped to the first storage node, method 500 proceeds to 540. For example, if the first storage node is storage node 410-1 in first storage node group 405 in FIG. 4 and the second storage node is storage node 420-1 in second storage node group 415 in the figure, the second storage node is mapped to the first storage node.

At 540, there is a mapping relationship between the first storage node and the second storage node, and data may be transmitted between the first storage node and the second storage node using an RDMA protocol. It should be understood that, in some other embodiments, other data transmission protocols may also be used to perform data transmission between mutually mapped storage nodes.

The number of data streams (or queue pairs) can be greatly reduced by using the method described above with reference to FIG. 5. In this way, the hardware usage burden of storage system 100 can be reduced. In addition, since the number of data streams is reduced, less memory space and CPU resources can be occupied. Therefore, more memory space and CPU resources are not occupied, so more memory space and CPU resources can be used to perform other operations of storage system 100. Therefore, the performance of storage system 100 can be improved, and data can be transmitted more effectively. In addition, since not all the storage node inside storage device 120 need to have an interconnection structure with each other, the structure is simpler. Especially when storage system 100 is started or restarted, since the connection structure of storage device 120 is simpler, the startup process of storage system 100 may be accelerated.

Figure 6:
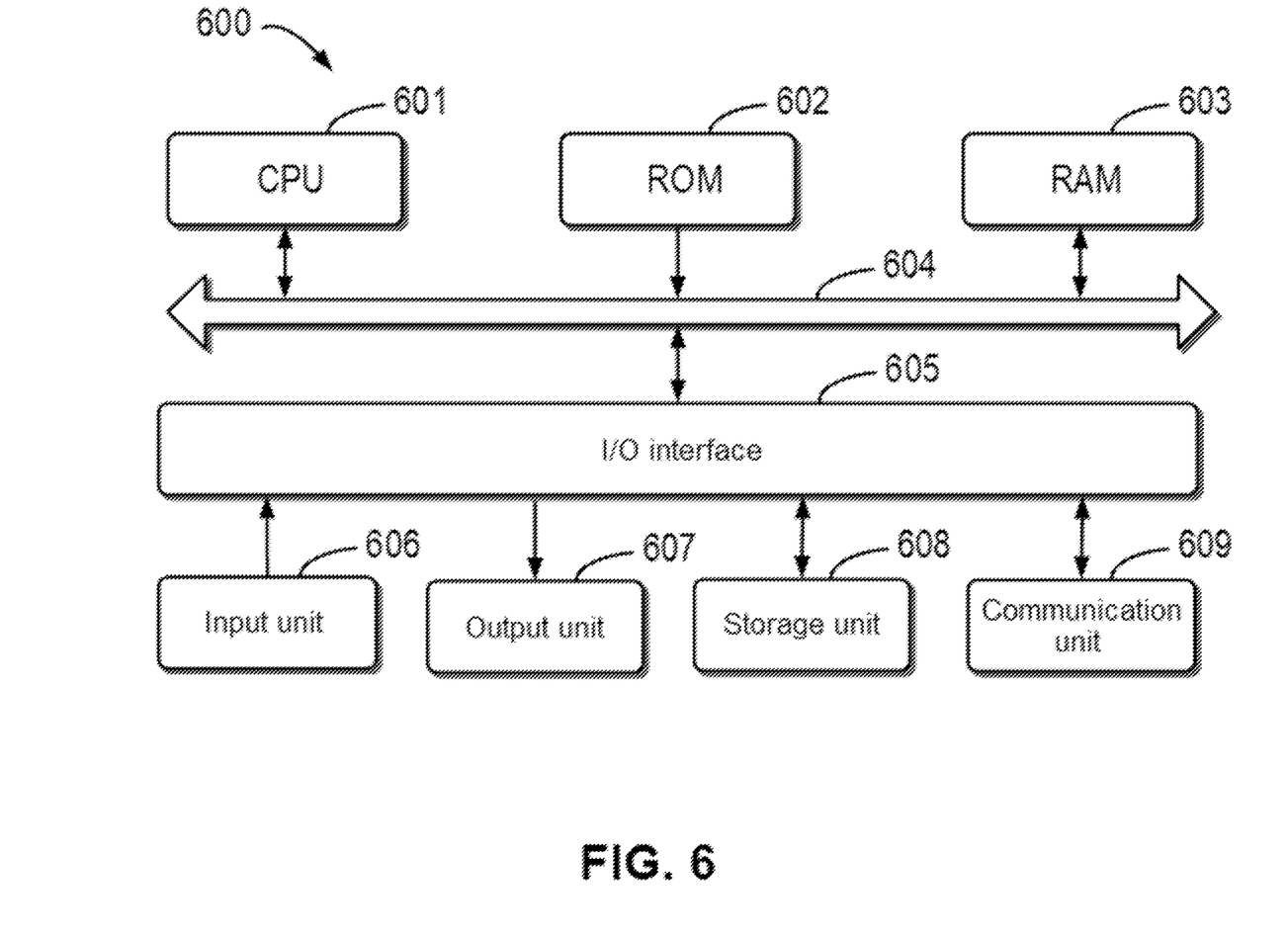
FIG. 6 shows a schematic block diagram of an example device that may be used to implement an embodiment of the present disclosure.

FIG. 6 shows a schematic block diagram of example device 600 that may be used to implement an embodiment of the content of the present disclosure. For example, storage system 100 as shown in FIG. 1 may be implemented by device 600. As shown in FIG. 6, device 600 includes (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, such as methods 300 and/or 500, may be performed by processing unit 601. For example, in some embodiments, methods 300 and/or 500 may be embodied as a computer software program that is tangibly included in a machine-readable medium, such as storage unit 608. In some embodiments, part or all of the computer program may be loaded and/or installed onto device 600 via ROM 602 and/or communication unit 609. When the computer program is loaded into RAM 603 and executed by CPU 601, one or more actions of methods 300 and/or 500 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, an RAM, an ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for executing the operation of the present disclosure may be assembly instructions, an instruction set architecture (ISA) instructions, machine instructions, machine-dependent instructions, microcode, firmware instructions, state setting data, or source code or object code written in any combination of one or more programming languages, including an object oriented programming language, such as Smalltalk, C++, and the like, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

What is claimed is:

1. A method, comprising:
   determining, by a system comprising a processor, in response to a request, directed to a first storage node, for data related to a second storage node, whether the first storage node and the second storage node belong to a same storage node group in a storage system, wherein storage nodes in the same storage node group have a same interconnection structure; and
   in response to determining that the first storage node and the second storage node belong to different storage node groups, transmitting the data between the first storage node and the second storage node based on a mapping between first storage nodes in a first storage node group and second storage nodes in a second storage node group, the first storage node group comprising the first storage node and the second storage node group comprising the second storage node, wherein transmitting the data between the first storage node and the second storage node based on the mapping comprises:
   determining whether the second storage node is mapped to the first storage node;
   in response to determining that the second storage node is not mapped to the first storage node, determining a third storage node in the second storage node group that is mapped to the first storage node; and
   transmitting the data between the first storage node and the second storage node via the third storage node.

2. The method according to claim 1, wherein a one-to-one mapping is established between a plurality of first storage nodes in the first storage node group and a plurality of second storage nodes in the second storage node group.

3. The method according to claim 1, wherein the request is a read request to read the data from the second storage node, and wherein transmitting the data between the first storage node and the second storage node via the third storage node comprises:
   sending the read request to the third storage node using a remote direct memory access protocol; and
   receiving the data from the third storage node, the data being sent by the second storage node to the third storage node via an interconnection structure of the second storage node group.

4. The method according to claim 1, wherein the request is a write request to write the data into the second storage node, and wherein transmitting the data between the first storage node and the second storage node via the third storage node comprises:
  sending the data to the third storage node using a remote direct memory access protocol, for the third storage node to send the data to the second storage node via an interconnection structure of the second storage node group.

5. The method according to claim 1, further comprising:
  in response to determining that the second storage node is mapped to the first storage node, transmitting the data between the first storage node and the second storage node using a remote direct memory access protocol.

6. The method according to claim 1, further comprising:
  in response to determining that the first storage node and the second storage node belong to the same storage node group, transmitting the data between the first storage node and the second storage node via the same interconnection structure that is the same for the first storage node and the second storage node.

7. The method according to claim 1, wherein the storage nodes in the same storage node group are located in a same fault tolerance domain.

8. A device, comprising:
  at least one processor; and
  at least one memory storing computer program instructions, wherein the at least one memory and the computer program instructions are configured to cause, together with the at least one processor, the device to perform actions comprising:
    determining, in response to a request, received at a first storage node, for data related to a second storage node, whether the first storage node and the second storage node belong to a same storage node group in a storage system, wherein storage nodes in the same storage node group having a common interconnection structure; and
    based on determining that the first storage node and the second storage node belong to different storage node groups, transmitting the data between the first storage node and the second storage node based on a mapping between first storage nodes in a first storage node group and second storage nodes in a second storage node group, the first storage node group comprising the first storage node and the second storage node group comprising the second storage node, wherein transmitting the data between the first storage node and the second storage node based on the mapping comprises:
      determining whether the second storage node is mapped to the first storage node;
      based on determining that the second storage node is not mapped to the first storage node, determining a third storage node in the second storage node group that is mapped to the first storage node; and
      transmitting the data between the first storage node and the second storage node via the third storage node.

9. The device according to claim 8, wherein a one-to-one mapping is established between a first group of storage nodes in the first storage node group and a second group of storage nodes in the second storage node group.

10. The device according to claim 8, wherein the request is a read request to read the data from the second storage node, and wherein transmitting the data between the first storage node and the second storage node via the third storage node comprises:
  sending the read request to the third storage node using a remote direct memory access protocol; and
  receiving the data from the third storage node, the data being sent by the second storage node to the third storage node via an interconnection structure of the second storage node group.

11. The device according to claim 8, wherein the request is a write request to write the data into the second storage node, and wherein transmitting the data between the first storage node and the second storage node via the third storage node comprises:
  sending the data to the third storage node using a remote direct memory access protocol, wherein the third storage node is to send the data to the second storage node via an interconnection structure of the second storage node group.

12. The device according to claim 8, wherein the actions further comprise:
  based on determining that the second storage node is mapped to the first storage node, transmitting the data between the first storage node and the second storage node using a remote direct memory access protocol.

13. The device according to claim 8, wherein the actions further comprise:
  based on determining that the first storage node and the second storage node belong to the same storage node group, transmitting the data between the first storage node and the second storage node via the common interconnection structure common to the first storage node and the second storage node.

14. The device according to claim 8, wherein the storage nodes in the same storage node group are located in a same fault tolerance domain.

15. A computer program product stored on a non-transitory computer-readable medium and comprising machine-executable instructions, wherein the machine-executable instructions, when executed, cause a device to perform operations, comprising:
  in response to a request at a first storage node for data related to a second storage node, determining whether the first storage node and the second storage node belong to a same storage node group in a storage system, wherein storage nodes in the same storage node group have a same interconnection structure; and
  in response to determining that the first storage node and the second storage node belong to different storage node groups, transmitting the data between the first storage node and the second storage node based on a mapping between first storage nodes in a first storage node group and second storage nodes in a second storage node group, the first storage node group comprising the first storage node and the second storage node group comprising the second storage node, wherein transmitting the data between the first storage node and the second storage node based on the mapping comprises:
    determining whether the second storage node is mapped to the first storage node;
    in response to determining that the second storage node is not mapped to the first storage node, determining a third storage node in the second storage node group that is mapped to the first storage node; and
    transmitting the data between the first storage node and the second storage node via the third storage node.

16. The computer program product according to claim 15, further comprising:

in response to determining that the first storage node and the second storage node belong to the same storage node group, transmitting the data between the first storage node and the second storage node via the same interconnection structure.

17. The computer program product according to claim 15, wherein the storage nodes in the same storage node group are located in a same fault tolerance domain.

18. The computer program product according to claim 15, wherein the request is a read request to read the data from the second storage node, and wherein transmitting the data between the first storage node and the second storage node via the third storage node comprises:

sending the read request to the third storage node using a remote direct memory access protocol; and receiving the data from the third storage node, the data being sent by the second storage node to the third storage node via an interconnection structure of the second storage node group.

19. The computer program product according to claim 15, wherein the request is a write request to write the data into the second storage node, and wherein transmitting the data between the first storage node and the second storage node via the third storage node comprises:

sending the data to the third storage node using a remote direct memory access protocol, wherein the third storage node is to send the data to the second storage node via an interconnection structure of the second storage node group.

20. The computer program product according to claim 15, wherein the operations further comprise:

based on determining that the second storage node is mapped to the first storage node, transmitting the data between the first storage node and the second storage node using a remote direct memory access protocol.

* * * * *